United States Patent Office 3,484,405
Patented Dec. 16, 1969

3,484,405
SOLID ADHESIVE POLYMER COMPOSITIONS
Kenneth H. Seto, Sarnia, Ontario, Canada., assignor to Polymer Corporation Limited, Sarnia, Ontario, Canada, a body corporate and politic
No Drawing. Filed Nov. 21, 1966, Ser. No. 595,615
Claims priority, application Canada, Dec. 13, 1965, 947,633
Int. Cl. C08f 29/12, 45/28
U.S. Cl. 260—33.6                                       2 Claims

ABSTRACT OF THE DISCLOSURE

Solid adhesive compositions having good resistance to flow at moderate temperatures comprise unvulcanized mixtures of butyl rubber, polyethylene, a naphthenic oil or liquid polybutene plasticizer and a polyterpene or a petroleum resin as a tackifier in specified proportions.

---

This invention relates to adhesive compositions. In particular it relates to adhesive compositions based on rubbery polymers having little or no unsaturation.

In the formulation of adhesive compositions, it is desired to use materials which have good cohesive strength as well as good adhesion to a variety of surfaces such as fabrics, glass, metal or enamel. In specific applications adhesives are required to be plastic and easily applicable to the surfaces and yet they must be of sufficiently high viscosity to resist flow at moderate temperatures and hold bonded materials in place. In certain applications, they must have flexibility at low temperatures, high resistance to fatigue failure, and low compression resistance. It is also desired that adhesives be water-proof, resistant to ageing and/or attack by chemicals. It has not been previously possible to produce adhesive compositions with all the above properties. Further, it has been necessary to partially vulcanize previous adhesive compositions based on polymers of isobutylene to prevent sag or flow.

It is the object of this invention to provide an improved adhesive composition with satisfactory resistance to flow at moderate temperatures.

The composition of the present invention is a mixture comprised of (a) 100 parts by weight of a rubbery polymer from butyl rubber and ethylene-propylene copolymer containing 20–75 mole percent copolymerized ethylene, which copolymer may contain up to 5 mole percent of a copolymerized diolefin, (b) 5–75 parts by weight of a resinous polymer selected from polyethylene, polypropylene, ethylene-propylene copolymer containing more than about 80 mole percent ethylene, ethylene-vinyl acetate copolymer, trans 1,4-polyisoprene and trans 1,4 polybutadiene, (c) 25–4000 parts by weight of a plasticizer compatible with said rubbery polymer and (d) 5–150 parts by weight of a tackifying resin.

The preferred isobutylene polymer is butyl rubber. The term "butyl rubber" as used herein is intended to define rubbery copolymers of isobutylene with a diolefin containing 4 to 14 carbon atoms, usually isoprene, but diolefins such as butadiene, dimethyl butadiene and pentadiene may also be used, said copolymers containing 85 to 99.5 parts by weight of the olefin and 15 to 0.5 parts by weight of the diolefin. These copolymers are normally produced by low temperature polymerization using a solution of a Friedel-Crafts catalyst such as aluminium chloride in a low freezing solvent such as methyl or etheyl chloride at temperatures ranging from −10 to −100° C. or lower. The polymer thereby produced usually has a molecular weight between 200,000 and 600,000. The type of butyl rubber and the amount used are dependent on the properties such as shear strength and tack which are required in the final adhesive composition.

The rubbery ethylene propylene copolymers of this invention are usually prepared by copolymerizing the monomers in the presence of Ziegler catalysts at relatively low temperatures and pressures. The copolymer should contain from about 20 to 75 mole percent ethylene and may contain up to 5 mole percent of polymerized diolefin, such as dicyclopentadiene. The rubbery isobutylene polymer and ethylene propylene copolymer may be used in their halogenated forms. It is also within the scope of this invention to utilize mixtures of any of the rubbery isobutylene polymers and ethylene propylene copolymers described previously.

The resinous aliphatic polymer of this invention should be compatible with the aforementioned rubbery polymer and should be of sufficiently high molecular weight that the polymer is solid at room temperature. Resinous polymers, alone or in admixture with each other, which may be used include polyethylene, polypropylene, ethylene propylene copolymer containing more than about 80 mole percent ethene, ethylene-vinylacetate copolymer, trans 1,4 polyisoprene and trans 1,4-polybutadiene. The preferred resins are polyethylene and polypropylene because of their effectiveness in preventing cold flow of the adhesive compositions. The most preferred resin is polyethylene. The grade of polyethylene known as "low density" is the preferred form of this material. The adhesive compositions may contain 5–75 parts by weight of resinous polymer per 100 parts by weight of isobutylene polymer, the preferred range being 5–25 parts by weight.

In general, any of the plasticizers which are employed in rubber compounding may be used in the adhesive compositions of this invention provided they are compatible with the rubbery isobutylene polymer or ethylene-propylene copolymer. Various hydrocarbon oils can be used such as those which are obtained from catalytic cracking and dehydrogenation operations, extract oils from solvent extraction of lubricating oil stocks with furfural, phenol, etc., oils from alkylation reactions, polymers from clay tower treating of cracked gasolines, resins, coal tar products and vegetable oils. Naphthenic and paraffinic oils are usually preferred. In addition, liquid polybutene may be used as a plasticizer. The term "plasticizer" as used herein is also intended to include volatile organic solvents capable of solvating the rubbery isobutylene polymer or ethylene-propylene copolymer. Where liquid adhesive cements are desired volatile organic solvents such as benzene or toluene are used to dissolve the other components of the adhesive composition to form a solution of about 10 to 50 percent by weight but more preferably from 15 to 25 percent by weight. The adhesive composition may contain 25 to 4000 parts by weight of plasticizer per 100 parts by weight of rubbery polymer. A preferred amount of plasticizer is from 40 to 100 parts by weight in solid adhesive compositions. A preferred amount of plasticizer is from 400 to 2000 parts by weight in liquid adhesive cement compositions. It is also within the scope of this invention to utilize mixtures of any of the oils, liquid polybutene and organic solvents described previously.

Various types of tackifying resins, alone or in admixture with each other, can be used in preparing adhesive compositions as described herein. Examples of such tackifiers are poly-terpenes, coumarone-indene resins, condensation products of alkylated phenols with acetylene, epoxy resins, pine tar, etc. The adhesive composition may contain 5–150 parts by weight of tackifying resin per 100 parts by weight of rubbery polymer, preferred ranges being from 5–40 parts by weight in solid adhesive compositions and from 40–120 parts by weight in liquid adhesive compositions. The adhesive compositions of this invention should contain, a rubbery polymer, a resinous polymer, a plasticizer and a tackifying resin and may in addition contain a carbon black and a non-black filler.

Various types of reinforcing carbon blacks, alone or in admixture with each other, can be utilized in preparing the adhesive compositions as described herein. Examples of these blacks which are known in the trade include easy-processing channel (EPC), medium-processing channel (MPC), hard-processing channel (HPC), semi-reinforcing furnace (SRF), medium-abrasion furnace (MAF), reinforcing furnace (RF), high abrasion furnace (HAF), medium thermal (MT), fine thermal (FT) and the like.

Non-black fillers such as ferric oxide, magnesium carbonate, titanium dioxide, zinc oxide, hydrated aluminum, Kieselguhr, slate dust, zinc peroxide, zinc chloride, lead peroxide, lead oxide, chlorinated paraffins, glue, barytes, lithopone, various clays, finely divided silica, whiting, etc. can be added as fillers.

This invention is described in greater detail in the following examples.

EXAMPLE I

The compounds described below were mixed in a Banbury at an initial temperature of 280° F. Polyethylene and butyl rubber were added together; carbon black, then oil, were added later. The blend was removed from the Banbury at a temperature of 340° F. and was sheeted out on a warm two roll mill.

| Ingredient | Compound | | | |
|---|---|---|---|---|
| | 1 | 2 | 3 | 4 |
| Butyl rubber (a) | 100 | 100 | 100 | 100 |
| Polyethylene (b) | | 20 | 20 | |
| F. T. carbon black | | | 20 | 20 |
| Naphthenic oil (c) | 60 | 60 | 60 | 60 |

The butyl rubber (a) is a copolymer of isobutylene and isoprene containing about 1.6 mole percent of copolymerized isoprene and has a ML-8-212° F. Mooney viscosity of about 75. The polyethylene (b) is of the low density type and has a melt flow index of about 25. The naphthenic oil (c) has a specific gravity of 0.88 and a viscosity SSU (Saybolt universal seconds) of 47 at 210° F.

The compounds were tested for sag or flow at an elevated temperature in the following manner. Two similar strips of the adhesive composition were applied in parallel to each other upon the upper surface of a cleaned glass plate. A cleaned, enameled steel panel was placed on top of and in contact with the adhesive strips. The whole assembly was compressed in a laboratory press such that a predetermined distance of 0.20 inch between the juxtaposed glass and enamel surfaces was obtained. The test piece was then clamped to prevent any independent movement of the glass or enamel. The assembly was first conditioned for 24 hours at room temperature and then placed in an air circulating oven at 190° F. for 2 weeks. During exposure the test piece was placed on its edge. After exposure the strips of adhesive were examined for any sag below the applied position. The test results are recorded below.

| | Compound | | | |
|---|---|---|---|---|
| | 1 | 2 | 3 | 4 |
| Sag or flow after 2 weeks at 190° F. (inches) | 1.0 | 0.0 | 0.0 | 1.0 |

These results show that the presence of 20 parts of polyethylene per 100 parts of butyl rubber prevented sag during exposure at an elevated temperature.

EXAMPLE II

The following compounds were mixed using the procedure of Example I, except that the clay (e) was added with the polyethylene, the resin (f) was added with the carbon black and the polybutene (g) was used in place of the naphthenic oil.

| Ingredient | Compound | |
|---|---|---|
| | 1 | 2 |
| Butyl rubber (a) | | 100 |
| Butyl rubber (d) | 100 | |
| Polyethylene (b) | 15 | 12 |
| Hydrated aluminium silicate clay (e) | 20 | 20 |
| SRF carbon black | 75 | 70 |
| Polyterpene resin (f) | 20 | 15 |
| Liquid polybutene (g) | 80 | 70 |

The butyl rubber (d) is a copolymer of isobutylene and isoprene containing about 2.2 mole percent of copolymerized isoprene and has a ML-8-212° F. Mooney viscosity of about 45. The hydrated aluminum silicate clay (e) has a specific gravity of 2.6 and 99 percent of the material can be passed through a 300 mesh sieve. Polyterpene resin (f) is a thermoplastic resin prepared by polymerizing pinene. Polybutene (g) is a liquid polymer having a viscosity of 1080 SSU at 210° F. The compounds were evaluated by several different tests, said tests being performed according to the following procedures. The solids content was determined using ASTM procedure D553. The ash content was determined by measuring the amount of residue after heating a sample of the composition for one hour at 1400° F. Specific gravity was measured using ASTM procedure D297. Yield strength was determined by measuring the force required to separate the glass and steel plates of an assembly similar to that described in the previous example. Low temperature flexibility was determined by bending a strip of the adhesive composition half-way round a mandrel one inch in diameter maintained at −20° F. Heat resistance was determined on a bonded test assembly, similar to that previously described, by heating the test piece at 275° F. for 45 minutes. Paint compatibility was determined by placing the adhesive on an enameled steel surface and examining the interface, after two weeks exposure at 190° F. Ozone resistance was determined after exposure of the test piece in a chamber containing 50 pphm of ozone at 100° F. for 70 hours. Compression characteristics were determined by measuring (a) the force to compress the bonded test piece, prepared as described previously but consisting of two 3″ x ⅜″ x ⅜″ adhesive strips between two glass plates, such that the separation between the juxtaposed glass surfaces was 0.200 inch (b) the residual load, or back pressure, remaining one minute after maintaining compression at the aforementioned separation and (c) the separation between the glass plates, or rebound height, over a 24 hour period after the compressive forces were removed.

The following test results were obtained on the above compositions.

TABLE I

| Test | Compound 1 | Compound 2 | Desirable test result |
|---|---|---|---|
| Solids (percent) | 99.98 | 99.90 | >99. |
| Ash (percent) | 5.90 | 6.23 | <13. |
| Specific gravity | 1.00 | 1.08 | 1.05–1.15. |
| Sag or flow after 2 weeks at 190° F. (inches). | <0.06 | <0.06 | <0.06. |
| Hardness: | | | |
|   Shore A | 24 | 20 | 15–25. |
|   Shore 00 | 78 | 80 | 75–85. |
| Unaged yield strength (p.s.i.). | 13.2 (CF) | 13.4 (CF) | >712 (CF). |
| Paint compatibility | Acceptable | Acceptable | No staining, pinholing, blistering or softening of paint. |
| Low temperature flexibility. | do | do | No cracking. |
| Heat resistance | do | do | No plasticizer migration, flow, blistering or loss of adhesion. |
| Ozone resistance | do | | No cracking. |
| Compression Recovery: | | | |
|   Force to compress (lb.). | 149 | | <150. |
|   Residual load (lb.) | 21 | | <30. |
|   Rebound height after— | | | |
|     5 minutes (inches) | 0.215 | | <0.260. |
|     2 hours (inches) | 0.220 | | <0.275. |
|     24 hours (inches) | 0.224 | | <0.275. |

The abbreviations ">," "<" and "CF" are used to indicate "more than," "less than" and "complete cohesive failure" respectively.

The above results indicate that adhesive compound 1 is suitable for use as an automotive sealant tape, that is it could be employed in bonding glass to enameled metal surfaces as in automobile windshield and rear light assemblies. Adhesive compounds 1 and 2 can both be used in the construction industry for sealing curtain wall windows, that is double glazed windows, and panels.

EXAMPLE III

The following compound was mixed using the procedure of Example I, except that the clay was added with the polyethylene and the resin was added with the carbon black.

Ingredient:
- Butyl rubber (a) _____ 100
- Polyethylene (b) _____ 12
- Hydrated aluminum silicate clay (e) _____ 20
- SRF carbon black _____ 70
- Petroleum resin (h) _____ 20
- Naphthenic oil (c) _____ 50

Ingredient (h) is a thermoplastic polymer prepared by polymerizing a mixture of aliphatic monoolefins and diolefins.

The compound was tested for peel strength in the following manner. The adhesive compound of this example was placed between two sheets of vulcanized butyl rubber. The test piece was compressed for 10 seconds at room temperature at a pressure 14 kg./cm.² and allowed to rest for 48 hours at room temperature. The laminate was inserted in a tensile test instrument and the vulcanized butyl sheets which overlapped on one side of the bond, were clamped in separate pairs of jaws of the machine and then pulled apart at a rate of 20 cm. per minute. The force required to peel off the strips is called the T-peel strength.

The compound was tested for shear strength as follows. The adhesive composition of the example was placed in contact with the overlapping offset ends of two butyl sheets and the assembly was arranged such that the sheets partially overlapped forming an overlap joint with a bonded area of 2 square inches. After compression the assembly was allowed to rest for 48 hours at room temperature and then tested for shear strength. In the test, the free ends of the respective butyl sheets were clamped in a tensile tester and pulled apart at a separation rate of 50 cm. per minute.

The following test results were obtained

| | Cf. |
|---|---|
| T-Peel Strength (lbs./inch) | 9.5 |
| Shear strength (lbs./square inch of contact area) | 15 |

These results suggest that the above adhesive composition is suitable for use as a joining adhesive and backing compound for roof membranes and as a jointing tape for reservoir linings.

Other applications of the adhesive composition of this invention, in addition to those described in the examples, are as a laminating compound for automobile roof trim, a sealing gasket for clap pipe joints, a sealing gasket for highway expansion joints and a studding adhesive for panels, and as a caulking compound for joints, curtain wall windows and panels.

What is claimed is:

1. A solid adhesive composition comprising an unvulcanized mixture of (a) 100 parts by weight of butyl rubber, (b) 5–25 parts by weight of polyethylene, (c) 25–100 parts by weight of a plasticizer selected from napthenic oils and liquid polybutenes, (d) 5–40 parts by weight of a tackifying resin selected from polyterpenes and petroleum resins, (e) 0 to 100 parts by weight of a carbon black and (f) 0 to 300 parts by weight of a nonblack filler.

2. The composition of claim 1 in which the amount of plasticizer is from 50–80 parts by weight.

References Cited

UNITED STATES PATENTS

| 2,875,170 | 2/1959 | Ayers et al. | 260—33.6 |
| 3,132,027 | 5/1964 | Norton et al. | |
| 3,220,966 | 11/1965 | Flanagan | 260—27 |
| 3,318,977 | 5/1967 | Battersby et al. | 260—889 |

OTHER REFERENCES

G. Alliger et al., "Vulcanization of Elastomers," 1964, Reinhold Publishing Corporation, New York, p. 316.

ALLAN LIEBERMAN, Primary Examiner

U.S. Cl. X.R.

260—41.5, 887, 888, 889

UNITED STATES PATENT OFFICE
CERTIFICATE OF CORRECTION

Patent No. 3,484,405                          December 16, 1969

Kenneth H. Seto

It is certified that error appears in the above identified patent and that said Letters Patent are hereby corrected as shown below:

Column 1, line 46, after "polymer" insert -- selected --. Column 2, line 2, "etheyl" should read -- ethyl --. Columns 5 and 6, Table I, under the heading "Desirable Test Result" ">712 (CF)" should read -- 12>(CF) --.

Signed and sealed this 8th day of December 1970.

(SEAL)
Attest:

Edward M. Fletcher, Jr.                        WILLIAM E. SCHUYLER, JR.
Attesting Officer                                    Commissioner of Patents